Aug. 29, 1967   H. K. SCHILLING   3,338,350
FRICTIONAL TORQUE TRANSMITTING DEVICE
Filed April 28, 1965   3 Sheets-Sheet 1

INVENTOR.
HUGH K. SCHILLING
BY
Caswell, Lagaard & Wicks
ATTORNEYS

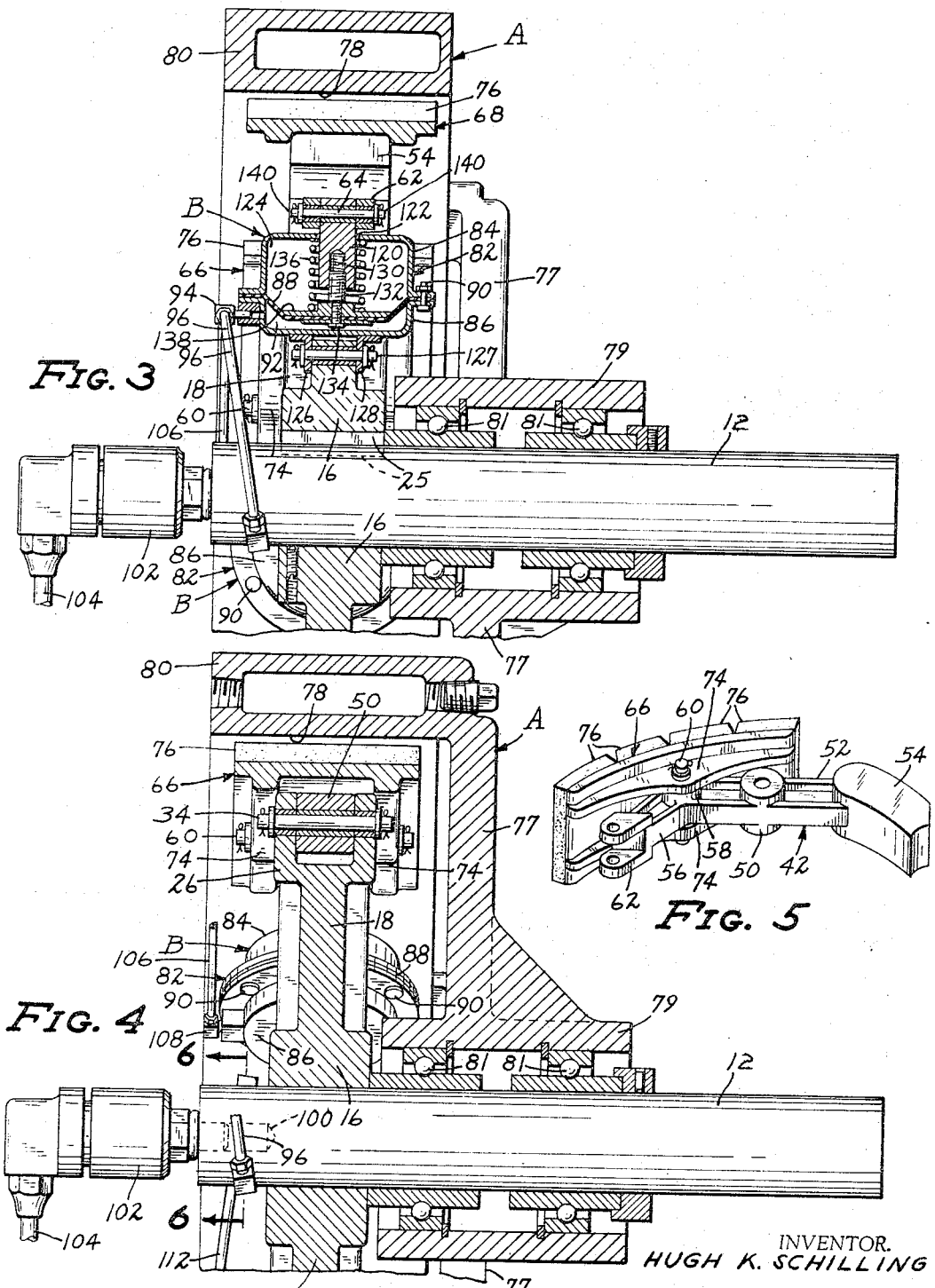

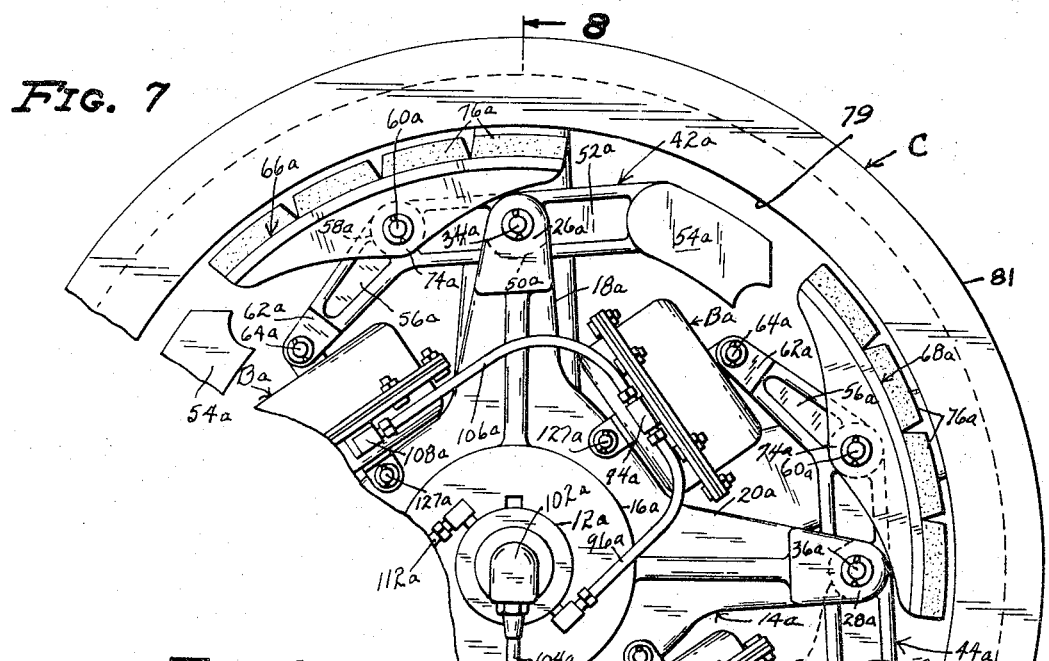
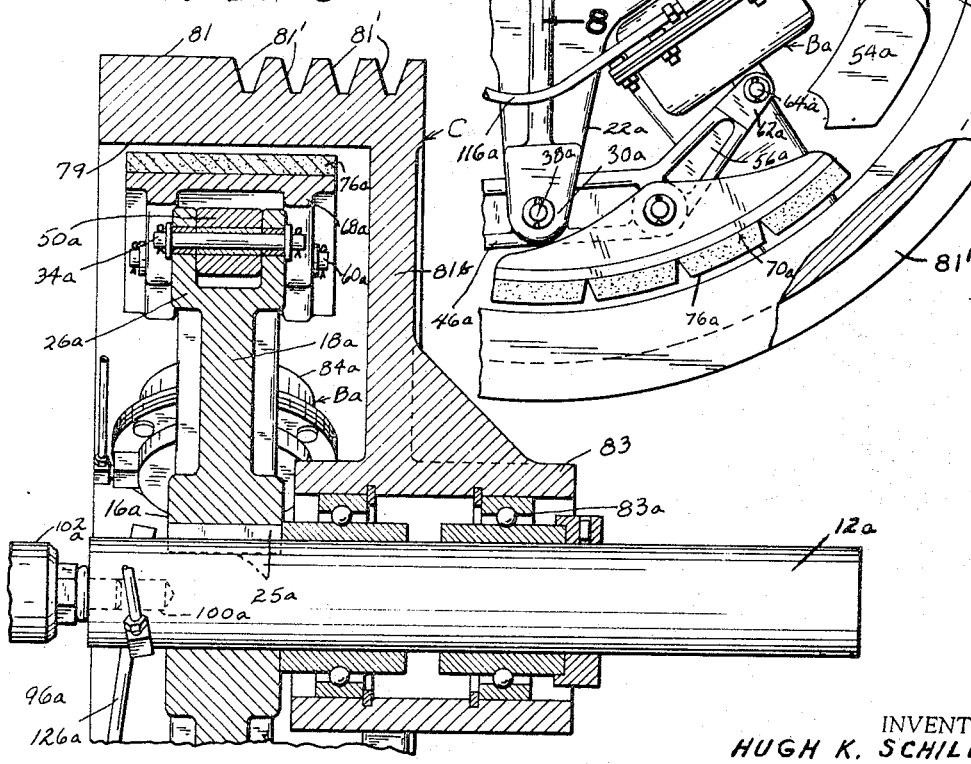

United States Patent Office 3,338,350
Patented Aug. 29, 1967

3,338,350
FRICTIONAL TORQUE TRANSMITTING DEVICE
Hugh K. Schilling, St. Paul, Minn., assignor to Horton Manufacturing Co., Inc., Minneapolis, Minn.
Filed Apr. 28, 1965, Ser. No. 451,450
11 Claims. (Cl. 188—184)

ABSTRACT OF THE DISCLOSURE

The invention relates to a frictional torque transmitting device which can be used as a clutch or a brake and which includes a first member having an annular internal surface of revolution, a spider member coaxial with the first member and having a plurality of weight arms pivotally mounted by a first pivot means thereon. The first member or the spider member is rotatable on an axis relative to the other. Each weight arm has a shoe pivotally mounted on the same by a second pivot means. Further provided are means for urging the shoes into frictional engagement with the surface of revolution. The first and second pivot means and the axis of rotation are disposed relative to one another so that a line passing through the first and second pivot means is substantially normal to a line passing through said axis of rotation and the first pivot means.

---

The invention relates to an improvement in a rotary torque transmitting device and more particularly to such a device which has the same torque output in either direction of rotation of the friction shoe assembly with respect to a fixed annular shell in a brake construction and a rotating annular member in a clutch construction when an equal force is applied.

It is an object of the invention to provide a frictional torque transmitting device incorporating a governor and having a weight arm pivotally mounted on a radially extended spider arm and a friction shoe pivotally connected thereto which gives the same total output of force in either direction of rotation of the friction assembly unit for an equally applied force. This is particularly desirable where a device is required for unwinding large rolls of material in either direction and where the speed of the shaft of the roll of sheet material continuously increases due to the decreasing size of the roll and a uniform tension is required on the material such as in paper textile mills and the like.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of examples preferred embodiments of the inventive idea wherein like numerals refer to like parts throughout.

In the drawings forming part of this application:

FIGURE 3 is a sectional view on the line 3—3 of FIGURE 1.

FIGURE 4 is a sectional view on the line 4—4 of FIGURE 1.

FIGURE 5 is a perspective view of one brake shoe and weight arm removed from the brake unit.

FIGURE 7 is a front elevational view of a modified embodiment, portions of which are broken away, other portions shown in section.

FIGURE 8 is a sectional view on the line 8—8 of FIGURE 7.

Figure 1:
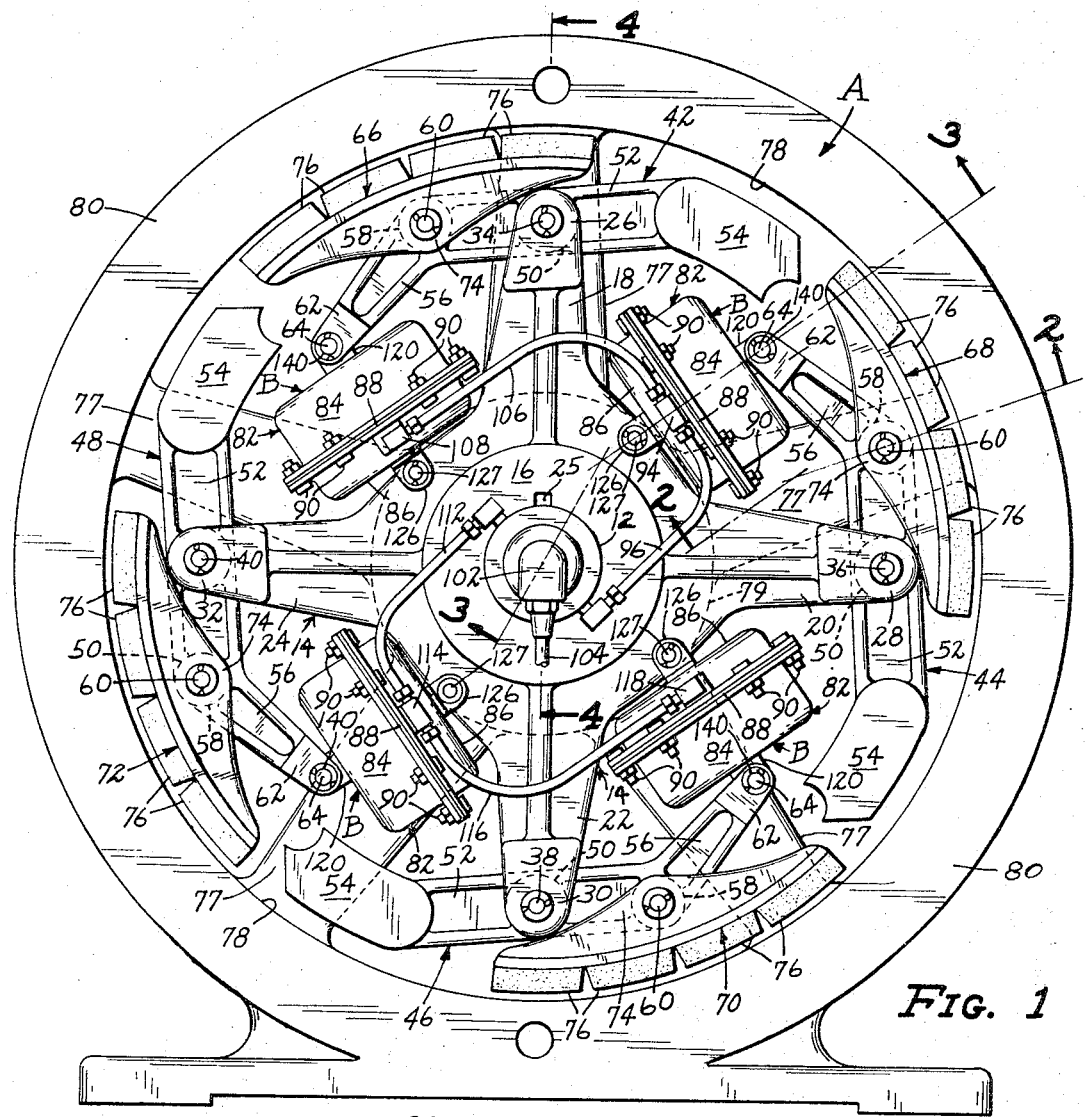
FIGURE 1 is a front elevational view of the brake with the outer frame removed.
Figures 2, 6:
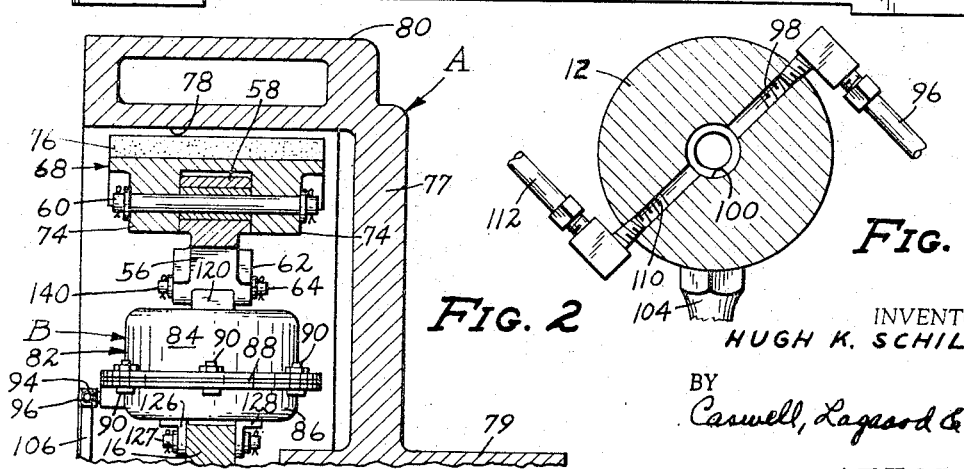
FIGURE 2 is a sectional view on the line 2—2 of FIGURE 1.
FIGURE 6 is a sectional view on the line 6—6 of FIGURE 4.

Referring to the drawings in detail wherein FIGURES 1–6 disclose a brake construction while FIGURES 7 and 8 disclose a clutch construction each embodying the invention, the brake A includes the shaft 12 on which is secured the spider assembly 14 which includes the hub 16 from which extends the radial spider arms 18, 20, 22 and 24. The hub 16 is secured to the shaft 14 by means of the key 25. The outer end of each of the spider arms 18, 20, 22 and 24 is formed with a bifurcated portion 26, 28, 30 and 32, respectively, each of which mounts the weight arm first pivot pins 34, 36, 38 and 40, respectively.

Further provided are the weight arms 42, 44, 46 and 48. Inasmuch as the weight arms are identical only arm 42 will be described in detail. The weight arm 42 includes the bearing portion 50 which is formed substantially centrally of the main arm portion 52, the arm portion 52 terminating at the outer end in the weight 54 and at the other end in the angularly disposed short arm portion 56. At the juncture of the short arm portion 56 and the main arm portion 52 is the bearing portion 58 through which the shoe second pivot pin 60 extends. The outer free end of the short arm portion 56 is bifurcated as at 62 which mounts the diaphragm link pivot pin 64.

The first pivot pin 34 extends through the bifurcated portion 26 of the spider arm 18 and the bearing portion 50 of the weight arm 42 thereby pivotally mounting the weight arm 42 on the radially extending spider arm 18.

Further provided are the friction brake shoes 66, 68, 70 and 72, which are identical. Each shoe includes the bifurcataed portion 74 in which the shoe pivot pin 60 is mounted thereby pivotally mounting the shoe 68, for example, directly on the bearing portion 58 of the weight arm 44. Secured to each of the faces of the shoes 66, 68, 70 and 72 is the friction facing member 76 which engages the annular internal braking surface 78 of the hollow cylindrical peripheral shell casing 80 the surface 78 constituting an internal surface of revolution. The casing 80 forms a first member and has connected thereto a plurality of radial web support members 77 connected at the inner ends to the sleeve hub 79 in which the shaft 12 rotates by means of the bearings 81. It will be seen that the spider 14 cooperates with and is coaxially disposed relative to the annular surface of revolution 78.

Of prime importance here in producing equal torque in either direction of rotation of the brake A with an equal force applied is the angular relationship of the spider 18 to the weight arm 42. The construction of the spider arm 18 and the weight arm 42 is such that a line passing through the axis of rotation and the first pivot pin 34 is substantially normal to a line passing through the pivot pin 34 and the second pivot pin 60. In addition, the shoe pin 60 mounting the shoe 66 is substantially on the centerline of the main weight arm portion 52, and the pin 34 is substantially on the centerline of the weight arm portion 52 and the centerline of the spider arm 18.

As a highly effective and positive control of the adjustment of each of the weight arms 42, 44, 46 and 48 and weight arm 44 in particular, there is provided the diaphragm rod control units B. The units B are identical and each includes the diaphragm housing 82 composed of the circular cup-shaped upper half portion 84 and the circular lower cup-shaped half portion 86, and the diaphragm 88 is secured between the half housing portions 84 and 86 by means of a plurality of screws 90 thereby forming the enclosed chamber 92, particularly FIGURE 3, into which air under pressure is introduced through the T fitting 94 from air inlet line 96. Inlet line 96 is connected to the radial air passage 98 formed in shaft 12 leading to axial passage 100 which connects with the stationary rotary air union 102 and air supply line 104 connected thereto.

Air pressure is supplied to the adjacent unit B, upper left of FIGURE 1, by means of the line 106 leading from the T 94 to the connection 108 secured to the unit B designated. Thus, the radial air passage 98 feeds both diaphragm units B shown in the upper half of FIGURE 1. Shaft 14 is also formed with the radial air passage 110 connecting air inlet line 112 with the axial air passage 100. Air inlet line 112 is connected to the T connection 114 of unit B on the lower left of FIGURE 1, and leading from the T 114 is the line 116 which connects with the unit B on the lower right of FIGURE 1 by means of the connector 118. The radial air passage 110 feeds both diaphragm units B shown in the lower half of FIGURE 1.

With further reference in particular to FIGURE 3 there is provided the connector pin 120 which is pivotally connected at its upper end to the diaphragm link pin 64. The pin 64 extends outwardly through the hole 122 formed in the top of the upper half portion 84 of the diaphragm unit B and the chamber 124 formed on the side of the diaphragm opposite to chamber 92 is vented to the atmosphere due to the hole 122.

The diaphragm unit B is pivotally mounted on the hub 16 by means of the spaced flanges 126 and 128 connected to the outer underside of the lower half portion 86, with the spider diaphragm pin 127 extending through holes in the flanges 126 and 128 and through a hole extending through the hub 16. The connector pin 120 has extending thereinto the threaded hole 130 in which is adjustably positioned the threaded pin 132. The pin 132 is secured axially to diaphragm 88 by means of the small threaded bolt 134 extending axially through the member 88 and threadedly engaging the pin 132. The numeral 136 designates a coil spring mounted on the connector pin 120 and positioned against the top of the half portion 84 of housing 82 and the plate 138 mounted on the inner surface of diaphragm 88. The spring 136 normally urges the diaphragm 88 toward the half housing portion 86 with the result that the shoe facings 76 are out of contact with surface 79 when the brake is inoperative.

The amount of air pressure entering the chamber 92 of each of the housings 84 through the lines heretofore mentioned is introduced into the union 102 through the supply line 104 which is equipped with a quick on-and-off valve, pressure regulator, and visual air gauge not shown in the drawings so that the brake may be operated remotely through line 104 and have, at the same time, visual control of the speeds of the brake. The air pressure may be controlled separately by either the quick control of the on-and-off valve mentioned where fine adjustments of the speed of the shaft are not needed or by a screw type regulator valve when fine adjustments in speeds are required.

Broadly speaking, the brake A operates by means of the air diaphragms 88 actuated by the force of air pressure built up in the chamber 92 of the housing 82 thereby actuating the connector pin 120 against the action of the spring 136 which in turn exerts pressure against the bifurcated end 62 of short arm portion 56 of the weight arm 42. As a result, the weight arm 42 forces the shoe faces 76 of shoes 66 against the surface 78 of peripheral casing 80 which produces a braking of the shaft 12. The speed of the shaft 12 is governed at given speeds by means of the centrifugal force of the weight 54 against the air pressure in the chamber 92 acting against the diaphragm 88.

In the operation of the brake A air pressure is introduced in the chamber 92 and against the diaphragm 88 whereby a shoe is urged against the inner surface 78 of the casing 80 so that the shaft 12 will rotate at a desired r.p.m. As the shaft 12 increases in r.p.m. the centrifugal force of the weights 54 increases and the weights tend to move outwardly of the brake A and through the weight arms 42 and the mounting thereof described, the shoes 66 are drawn away from the surface 78 thereby decreasing the torque output of the shaft 12.

With regard to the applied force hereinbefore mentioned, a force of 100 pounds, for example, is exerted against the point 140 by the diaphragm 88 through the rod 120 at zero r.p.m. This same 100-pound force at 200 r.p.m. is less due to the centrifugal force of the weights 54 transmitted through the arms and linkage heretofore described.

As the r.p.m. of the shaft 12 increases, the weights 54 tend to fling outwardly creating a force opposite to that applied through the rod 120, thereby reducing the total force applied through the shoes 66 against the surface 78 with the result of a total decreased torque output of the unit without having to reset the force applied to the rod 120 through the diaphragm unit B. The brake A is adjustable throughout its entire torque range from zero to maximum by means of a pressure regulator. With an increase in pressure the torque is increased. With a decrease in air pressure the torque is decreased.

With regard to FIGURES 7 and 8, a clutch construction is disclosed which embodies the invention. The clutch C includes the shaft 12a on which is secured the spider assembly 14a which is identical to the spider assembly 14 of FIGURES 1–6. The parts of the clutch C of FIGURES 7 and 8 which are identical to the parts of the brake A are indicated by the same reference numeral accompanied by the small letter a. The spider assembly 14a includes the hub 16a from which extends the radial spider arms 18a, 20a, and 22a, a further spider as in the brake not being shown. The outer end of each of the spider arms 18a, 20a, and 22a is formed with bifurcated portions 26a, 28a and 30a, respectively, each of which mounts the weight arm first pivot pins 34a, 36a and 38a, respectively The hub 16a is connected to shaft 12a by means of key 25a.

Additionally provided are the weight arms 42a, 44a and 46a. Inasmuch as the weight arms are identical only arm 42a will be described in detail. The weight arm 42a includes the bearing portion 50a which is formed substantially centrally of the main arm portion 52a, the main arm portion 52a terminating at the outer end in the weight 54a and at the other end in the angularly disposed short arm portion 56a. At the juncture of the short arm portion 56a and the main arm portion 52a is the bearing portion 58a through which the shoe second pivot pin 60a extends. The outer free end of the short arm portion 56a is bifurcated as at 62a which mounts the diaphragm link pivot pin 64a.

The first pivot pin 34a extends through the bifurcated portion 26a of the spider arm 18a and the bearing portion 50a of the weight arm 42a thereby pivotally mounting the weight arm 42a on the radially extending spider arm 18a.

Further provided are the friction shoes 66a, 68a and 70a, which are identical, a further shoe as in the brake not being shown. Each shoe includes the bifurcated portion 74a in which the shoe pivot pin is mounted thereby pivotally mounting the shoe 66a, for example, directly on the bearing portion 58a of the weight arm 42a. Secured to each of the faces of the shoes 66a, 68a and 70a is the friction facing member 76a which engages the annular internal braking surface 79 of the annular peripheral pulley shell 81. The pulley shell 81 has formed on the outer surface thereof the V-grooves 81 in which are positioned V belts which drive the pulley shell 81 from a source of power not shown. The shell 81 has connected thereto a plurality of radial web support members 81b connected at the inner ends to the sleeve hub 83 in which shaft 12a rotates by means of bearings 83a. It will be seen that the spider 14a cooperates with and is coaxially disposed relative to the annular surface of revolution 79.

Of prime importance here in producing equal torque in either direction of rotation of the clutch C with an equal force applied is the angular relationship of the spider arm 18a to the weight arm 42a. The construction of the spider arm 18a and the weight arm 42a is such that a line passing through the axis of rotation and the pivot pin 34a is substantially normal to a line passing through the first pivot pin 34a and the second pivot pin 60a. In addition, the shoe pin 60 mounting the shoe 66a is substantially on the centerline of the main weight arm portion 52a, and the pin 34a is substantially on the centerline of the weight arm portion 52a and the centerline of the spider arm 18.

As a highly effective and positive control of the adjustment of each of the weight arms 42a, 44a and 46a and weight arm 44a in particular, there is provided the diaphragm rod control units Ba. The units Ba are identical and each has the same construction as a unit B as disclosed in FIGURES 1–4.

The units Ba are operated in the same manner as the units B with air under pressure introduced through the T fitting 94a from air inlet line 96a. Inlet line 96a is connected to the radial air passage formed in shaft 12a identical to passage 98, FIGURE 6, leading to axial passage 100a which connects with the stationary rotary air union 102a and air supply line 104a connected thereto.

Air pressure is supplied to the adjacent unit Ba, upper left of FIGURE 7, by means of the line 106a leading from the T 94a to the connection 108a secured to the unit Ba designated. Thus the radial air passage such as 98 feeds both diaphragm units Ba shown in the upper half of FIGURE 7. A unit such as Ba and not shown in FIGURE 7 is provided with air pressure through line 112a and unit Ba at the lower right of FIGURE 7 is provided with air pressure through line 116a connected to a unit Ba not shown in FIGURE 7 but referred to above. Lines 96a and 112a both receive air pressure from radial air passages identical to 98 and 110, respectively, which are connected to axial passageway 100a connected to rotary air union 102a.

Each of the diaphragm units Ba is pivotally connected to the hub 16a in the same manner as with units B by means of a pin 127a between a pair of flanges 126a and 128a.

The amount of air pressure entering the diaphragm housings Ba through the lines mentioned is introduced into the union 102a through the supply line 104a which is equipped with a quick on-and-off valve, pressure regulator and visual air gauge not shown, so that the clutch C may be operated remotely through line 104a.

Broadly speaking, the clutch C operates by means of the air diaphragms of the units Ba actuating the ends 62a of the weight arms. As a result, the weight arms force the shoe faces 76a against the surface 79 of the pulley shell 81. As the shoe faces 76a contact pulley shell 81, the shaft 12a is thereby rotated. As the r.p.m. of the spider unit 14a increases the weights 54a tend to fling outwardly. The speed of the shaft 12a is governed at given speeds by means of the centrifugal force of weights 54a against air pressure in the diaphragm units Ba acting against the diaphragms therein.

The invention is not to be understood as restricted to the details set forth since these may be modified within the scope of the appended claims without departing from the spirit and scope of the invention.

Having thus described the invention what is claimed as new and desired to be secured by Letters Patent is:

1. In a frictional torque transmitting device:
  (a) a first member including an annular internal surface of revolution,
  (b) a second member cooperating with and coaxially disposed relative to said first member,
  (c) one of said members being rotatable on an axis relative to the other,
  (d) said second member being disposed within the confines of said internal surface of revolution of the first member,
  (e) a plurality of weight arms,
  (f) first pivot means pivotally connecting each weight arm intermediate its ends to said second member at equal distances from the axis of rotation,
  (g) a plurality of shoes corresponding in number to said weight arms and frictionally engageable with said surface of revolution,
  (h) second pivot means pivotally connecting each of said shoes to each of said weight arms to one side of said first pivot means,
  (i) a weight carried by each of said weight arms to the side of said weight arm opposite said second pivot means,
  (j) said first and second pivot means and the axis of rotation being disposed relative to one another so that a line passing through said first and second pivot means is substantially normal to a line passing through said axis of rotation and said first pivot means and
  (k) means for urging said shoes into frictional engagement with said surface of revolution.

2. In a frictional torque transmitting device:
  (a) a first member including an annular internal surface of revolution,
  (b) a second member cooperating with and coaxially disposed relative to said first member,
  (c) one of said members being rotatably on an axis relative to the other,
  (d) said second member being disposed within the confines of said internal surface of revolution of the first member,
  (e) a plurality of weight arms,
  (f) first pivot means pivotally connecting each weight arm intermediate its ends to said second member at equal distances from the axis of rotation,
  (g) a plurality of shoes corresponding in number to said weight arms and frictionally engageable with said surface of revolution,
  (h) second pivot means pivotally connecting each of said shoes to each of said weight arms to one side of said first pivot means,
  (i) a weight carried by each of said weight arms to the side of said weight arm opposite said second pivot means,
  (j) said first and second pivot means and the axis of rotation being disposed relative to one another so that a line passing through said first and second pivot means is substantially normal to a line passing through said axis of rotation and said first pivot means and
  (k) means engaging each of said weight arms to urge said shoes into frictional engagement with said surface of revolution.

3. In a frictional torque transmitting device:
  (a) a first member including an annular internal surface of revolution,
  (b) a second member cooperating with and coaxially disposed relative to said first member,
  (c) one of said members being rotatable on an axis relative to the other,
  (d) said second member being disposed within the confines of said internal surface of revolution of the first member,
  (e) a plurality of weight arms,
  (f) first pivot means pivotally connecting each weight arm intermediate its ends to said second member at equal distances from the axis of rotation,
  (g) a plurality of shoes corresponding in number to said weight arms and frictionally engageable with said surface of revolution,
  (h) second pivot means pivotally connecting each of said shoes to each of said weight arms to one side of said first pivot means,
  (i) a weight carried by each of said weight arms to the side of said weight arm opposite said second pivot means, (j) said first and second pivot means and the axis of rotation being disposed relative to one another so that a line passing through said first and second pivot means is substantially normal to a line passing through said axis of rotation and said first pivot means and (k) means pivotally connected to each of said weight arms outwardly of said second pivot means to urge said shoes into frictional engagement with said surface of revolution.

4. In a friction torque transmitting device:
(a) a first member including an annular internal surface of revolution,
(b) a second member cooperating with and coaxially disposed relative to said first member,
(c) one of said members being rotatable on an axis relative to the other,
(d) said second member being disposed within the confines of said internal surface of revolution of the first member,
(e) a plurality of weight arms,
(f) first pivot means pivotally connecting each weight arm intermediate its ends to said second member at equal distances from the axis of rotation,
(g) a plurality of shoes corresponding in number to said weight arms and frictionally engageable with said surface of revolution,
(h) second pivot means pivotally connecting each of said shoes to each of said weight arms to one side of said first pivot means,
(i) a weight carried by each of said weight arms to the side of said weight arm opposite said second pivot means,
(j) said first and second pivot means and the axis of rotation being disposed relative to one another so that a line passing through said first and second pivot means is substantially normal to a line passing through said axis of rotation and said first pivot means and
(k) a fluid operated expansible chamber device connected to each of said weight arms and urging said shoes into frictional engagement with said surface of revolution.

5. A speed responsive brake comprising:
(a) a fixed cylindrical casing having an internal annular braking surface,
(b) a shaft axially and rotatably mounted in said casing,
(c) a spider assembly secured to on said shaft,
(d) said spider assembly including a hub,
(e) a plurality of spider arms extending radially from said hub,
(f) a rigid weight arm for each of said spider arms including a main arm portion and an integral short arm portion extending outwardly from the inner end of said main arm portion,
(g) a shoe bearing portion formed at the juncture of said main weight arm portion with said short weight arm portion of each of said weight arms,
(h) each of said weight arms having a weight connected to the outer free end of said main arm portion thereof,
(i) each of said weight arms having a weight arm bearing portion intermediate said shoe bearing and said weight thereon,
(j) a first pivot pin connecting each of said weight arm bearing portions to the outer end of a spider arm to thereby pivotally mount each weight arm on a spider arm,
(k) a plurality of brake shoes,
(l) a second pivot pin connecting each of said brake shoes at said bearing portion to a weight arm,
(m) said first and second pivot pins and the axis of rotation being disposed relative to one another so that a line passing through said first and second pivot pins is substantially normal to a line passing through said axis of rotation and said first pivot pin, and
(n) means for adjustably moving the outer end of said short arm portion of each of said weight arms opposite the weight thereon to vary the position of each of said brake shoes relative to said annular braking surface of said casing to thereby cause a braking action of said shaft.

6. A speed responsive brake comprising:
(a) a fixed cylindrical casing having an internal braking surface,
(b) a shaft axially and rotatably mounted in said casing,
(c) a spider assembly mounted on said shaft,
(d) said spider assembly including a hub,
(e) a plurality of spider arms extending from said hub,
(f) a weight arm for each of said spider arms,
(g) each of said weight arms having a weight connected to the outer end thereof,
(h) a first pivot pin connecting each of said weight arms at a point intermediate its ends to the outer end of a spider arm,
(i) a plurality of brakes shoes,
(j) a second pivot pin connecting each of said brake shoes to a weight arm,
(k) said first and second pivot pins and the axis of rotation being disposed relative to one another so that a line passing through said first and second pivot pins is substantially normal to a line passing through said axis of rotation and said first pivot pin, and
(l) means for adjustably moving the outer end of said short arm portion of each of said weight arms opposite the weight thereon to vary the position of each of said brake shoes relative to said annular braking surface of said casing to thereby cause a braking action of said shaft.

7. A speed responsive brake comprising:
(a) a cylindrical casing having an internal braking surface,
(b) a shaft axially and rotatably mounted in said casing,
(c) a spider assembly mounted on said shaft,
(d) said spider assembly including a hub,
(e) a plurality of spider arms extending from said hub,
(f) a weight arm for each of said spider arms,
(g) each of said weight arms having a weight connected to the outer end thereof,
(h) a first pivot pin connecting each of said weight arms at a point intermediate its ends to the outer end of a spider arm,
(i) a plurality of brake shoes,
(j) a second pivot pin connecting each of said brake shoes to a weight arm,
(k) said first and second pivot pins and the axis of rotation being disposed relative to one another so that a line passing through said first and second pivot pins is substantially normal to a line passing through said axis of rotation and said first pivot pin,
(l) a housing mounted on said hub adjacent each of said spider arms,
(m) each of said housings having a diaphragm mounted therein,
(n) rod means connected to each of said diaphragms and extending from said housing with the outer end connected to the inner end of a weight arm, and
(o) means for introducing fluid pressure into each of said housings and against a diaphragm to actuate said rod means thereof to vary the position of the brake shoe on the weight arm relative to said braking surface of said casing.

8. A speed responsive brake comprising:
(a) a cylindrical casing having an internal braking surface, (b) a shaft axially and rotatably mounted in said casing,
(c) a spider assembly mounted on said shaft,
(d) said spider assembly including a hub,
(e) a plurality of spider arms extending from said hub,
(f) a weight arm for each of said spider arms,
(g) each of said weight arms having a weight connected to the outer end thereof,
(h) a first pivot pin connecting each of said weight arms at a point intermediate its ends to the outer end of a spider arm,
(i) a plurality of brakes shoes,
(j) a second pivot pin connecting each of said brake shoes to a weight arm,
(k) said first and second pivot pins and the axis of rotation being disposed relative to one another so that a line passing through said first and second pivot pins is substantially normal to a line passing through said axis of rotation and said first pivot pin, and
(l) means for causing said brake shoes to contact said braking surface of said casing and brake said shaft.

9. A clutch device comprising:
(a) a shaft,
(b) a pulley having an internal annular friction surface and rotatably mounted on said shaft,
(c) means for rotating said pulley,
(d) a spider assembly secured to said shaft,
(e) said spider assembly including a hub,
(f) a plurality of spider arms extending radially from said hub,
(g) a rigid weight arm for each of said spider arms including a main arm portion and an integral short arm portion extending outwardly from the inner end of said main arm portion,
(h) a shoe bearing portion formed at the juncture of said main weight arm portion with said short weight arm portion of each of said weight arms,
(i) each of said weight arms having a weight connected to the outer free end of said main arm portion thereof,
(j) each of said weight arms having a weight arm bearing portion intermediate said shoe bearing and said weight thereon,
(k) a first pivot pin connecting each of said weight arm bearing portions to the outer end of a spider arm to thereby pivotally mount each weight arm on a spider arm,
(l) a plurality of friction shoes,
(m) a second pivot pin connecting each of said friction shoes at said bearing portion to a weight arm,
(n) said first and second pivot pins and the axis of rotation being disposed relative to one another so that a line passing through said first and second pivot pins is substantially normal to a line passing through said axis of rotation and said first pivot pin, and
(o) means for adjustably moving the outer end of said short arm portion of each of said weight arms opposite the weight thereon to vary the position of each of said friction shoes relative to said annular friction surface of said pulley to thereby rotate said shaft.

10. A clutch device comprising:
(a) a shaft,
(b) a pulley having an internal annular friction surface and rotatably mounted on said shaft,
(c) means for rotating said pulley,
(d) a spider assembly secured to said shaft,
(e) said spider assembly including a hub,
(f) a plurality of spider arms extending from said hub,
(g) a weight arm for each of said spider arms,
(h) each of said weight arms having a weight connected to the outer end thereof,
(i) a first pivot pin connecting each of said weight arms at a point intermediate its ends to the outer end of a spider arm,
(j) a plurality of friction shoes,
(k) a second pivot pin connecting each of said friction shoes to a weight arm,
(l) said first and second pivot pins and the axis of rotation being disposed relative to one another so that a line passing through said first and second pivot pin is substantially normal to a line passing through said axis of rotation and said first pivot pin, and
(m) means for adjustably moving the outer end of each of said weight arms opposite the weight thereon to vary the position of each of said friction shoes relative to said annular friction surface of said pulley to thereby rotate said shaft.

11. A clutch device comprising:
(a) a shaft,
(b) a pulley having an internal annular friction surface and rotatably mounted on said shaft,
(c) means for rotating said pulley,
(d) a spider assembly secured to said shaft,
(e) said spider assembly including a hub,
(f) a plurality of spider arms extending from said hub,
(g) a weight arm for each of said spider arms,
(h) each of said weight arms having a weight connected to the outer end thereof,
(i) a first pivot pin connecting each of said weight arms at a point intermediate its ends to the outer end of a spider arm,
(j) a plurality of friction shoes,
(k) a second pivot pin connecting each of said friction shoes to a weight arm,
(l) said first and second pivot pins and the axis of rotation being disposed relative to one another so that a line passing through said first and second pivot pins is substantially normal to a line passing through said axis of rotation and said first pivot pin,
(m) a housing mounted on said hub adjacent each of said spider arms,
(n) each of said housings having a diaphragm mounted therein,
(o) rod means connected to each of said diaphragms and extending from said housing with the outer end connected to the inner end of a weight arm,
(p) means for introducing fluid pressure into each of said housings and against a diaphragm to actuate said rod means thereof to vary the position of the friction shoe on the weight arm relative to the annular friction surface of said pulley to thereby rotate said shaft.

References Cited

UNITED STATES PATENTS

| | | | |
|---|---|---|---|
| 2,197,522 | 4/1940 | Ferguson et al. | 192—104 X |
| 2,361,898 | 10/1944 | Ferguson et al. | 192—75 |
| 2,806,558 | 9/1957 | Schilling | 188—184 |

DUANE A. REGER, *Primary Examiner.*